United States Patent [19]

Ohji et al.

[11] Patent Number: 4,835,645
[45] Date of Patent: May 30, 1989

[54] ROTARY MAGNETIC HEAD ASSEMBLY

[75] Inventors: Toshio Ohji, Mito; Shinji Okada, Katsuta, both of Japan

[73] Assignee: Hitachi, Ltd., Tokyo, Japan

[21] Appl. No.: 113,605

[22] Filed: Oct. 28, 1987

[30] Foreign Application Priority Data

Nov. 5, 1986 [JP] Japan .................. 61-169086[U]

[51] Int. Cl.$^4$ .................. G11B 5/52; G11B 15/60
[52] U.S. Cl. .................. 360/108; 360/84; 360/130.24
[58] Field of Search .................. 360/108, 130.24, 84

[56] References Cited

U.S. PATENT DOCUMENTS 4,117,519 9/1978 Shioyama et al. .................. 360/84
4,669,022 5/1987 Van Rooij .................. 360/130.24

FOREIGN PATENT DOCUMENTS 57-198531 12/1982 Japan .................. 360/130.24
60-79503 5/1985 Japan .................. 360/108
60-195701 10/1985 Japan .................. 360/108
61-20723 6/1986 Japan .

Primary Examiner—John H. Wolff
Assistant Examiner—Matthew J. Bussan
Attorney, Agent, or Firm—Antonelli, Terry & Wands

[57] ABSTRACT

A rotary magnetic head assembly comprises rotatable and stationary cylinders disposed in confronting relation to each other. A rotary transformer is arranged between the cylinders and includes confronting rotatable and stationary transformer cores fixedly mounted respectively to the rotatable and stationary cylinders. An annular supporting member is located at an outer peripheral surface of the stationary transformer core and includes support portions for supporting the stationary transformer core. Signal transmission junction elements are provided on the outer peripheral portion of the supporting member. The outer peripheral portion of the supporting member is provided with bores through which fixing members are inserted to fix the stationary transformer core to the stationary cylinder. The outer peripheral surface of the stationary transformer core is formed to have a non-circular shape so that the outer peripheral portion of the stationary transformer core can rest on the support portions of the supporting member.

3 Claims, 6 Drawing Sheets

ROTARY MAGNETIC HEAD ASSEMBLY

BACKGROUND OF THE INVENTION

The present invention relates to a rotary magnetic head assembly for use in magnetic recording and reproducing apparatuses such as video players and, more particularly, to an improvement in a fixing structure of a rotary transformer arranged within a rotary head cylinder unit of the rotary magnetic head assembly.

In general, a rotary magnetic head assembly of a video player comprises a stationary cylinder, a rotatable cylinder having mounted thereto magnetic heads, and a rotary transformer arranged between the stationary and rotatable cylinders for transmitting signals between the heads and a magnetic recording and reproducing circuit of the video player body.

The conventional rotary transformer is composed of a stationary transformer core and a rotatable transformer core which are formed in a generally complete circular or annular shape, as disclosed in Japanese Utility Model Publication No. 61-20723. The stationary transformer core is fixed to the stationary cylinder by a ring-like fixing member, screws and the like.

In such rotary transformer and fixing structure thereof, however, if signal transmission channels corresponding in number to the magnetic heads increase in number, i.e., if coil mounting grooves formed in the stationary and rotatable transformer cores increase in number, the confronting area between both cores is reduced, resulting in a decrease in signal transmission efficiency.

SUMMARY OF THE INVENTION

It is an object of the invention to provide a rotary magnetic head assembly in which an increase in number of signal transmission channels does not cause a difficulty in assembling of various components, and does not also cause a reduction in signal transmission efficiency.

An arrangement of the invention is such that a transformer ring is disposed at an outer peripheral surface of a stationary transformer core and has support portions for supporting the core, the transformer ring has an outer peripheral portion provided with screw inserting bores into which screws are inserted for fixing the stationary transformer core to a stationary cylinder through the transformer ring, signal transmission junction elements are provided on the outer peripheral portion of the transformer ring, and the outer peripheral surface of the stationary transformer core is formed into a non-circular shape such that the outer periphery of the core can rest on the support portions of the transformer ring.

Since, according to the invention, it is possible to enlarge the configuration of stationary and rotatable transformer cores of the rotary transformer arranged within a rotary head cylinder unit, the confronting area per channel between the rotatable and stationary transformer cores increases, making it possible to reduce the transmission loss in the rotary transformer.

DETAILED DESCRIPTION

Figure 1A:
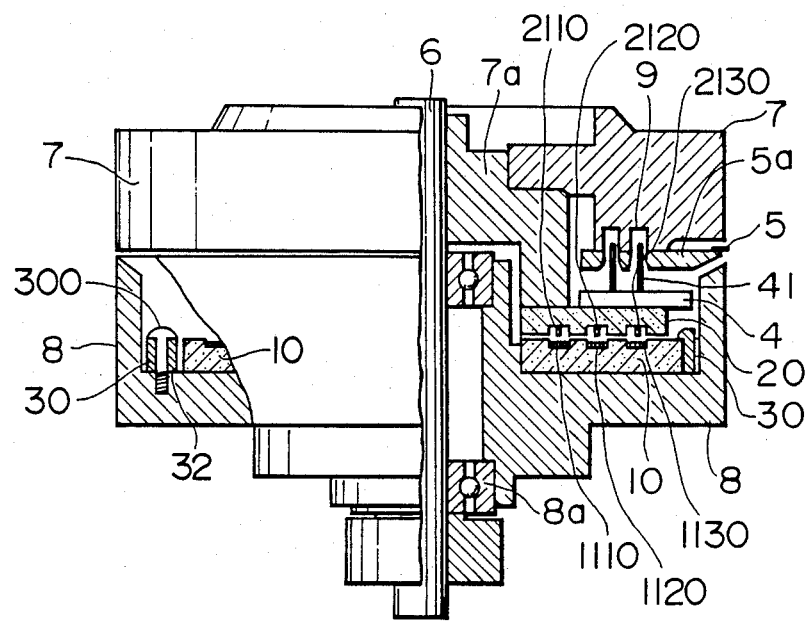
FIG. 1A is a partially broken-away side elevational view showing a rotary magnetic head assembly according to an embodiment of the invention.
Figure 1B:
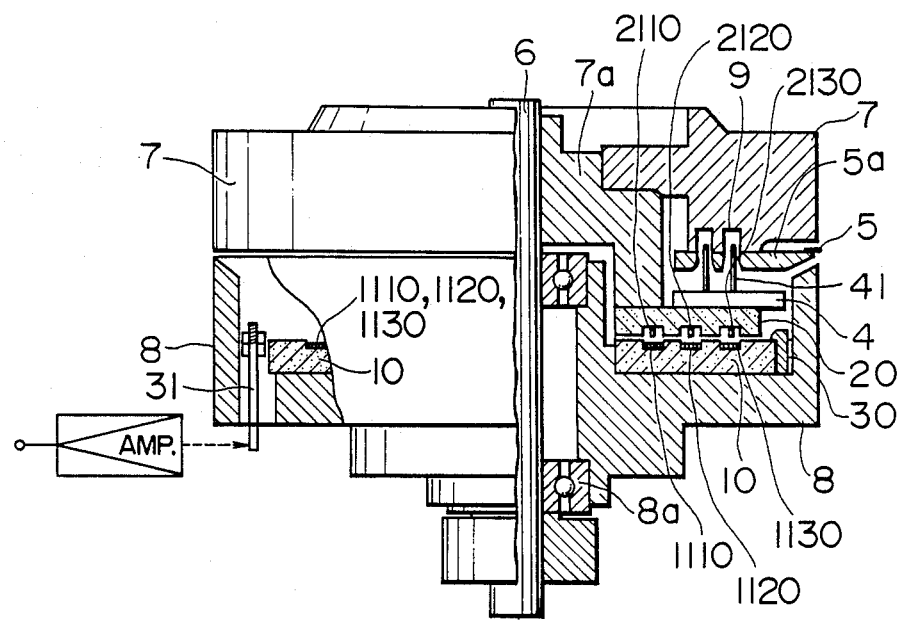
FIG. 1B is a view similar to FIG. 1A but broken-away in a different position.

An embodiment of the invention will be described hereunder with reference to the accompanying drawings. Referring to FIGS. 1A and 1B, there is illustrated a rotary magnetic head assembly according to the embodiment of the invention, which comprises a rotary shaft 6, a stationary cylinder 8 mounted on the rotary shaft 6 through bearings 8a, and a rotatable cylinder 7 mounted on the rotary shaft 6 through a rotatable disc 7a. The cylinders 7 and 8 are arranged in confronting relation to each other as illustrated in FIGS. 1A and 1B. A rotary transformer is composed of a stationary transformer unit and a rotatable transformer unit. The stationary transformer unit includes a stationary transformer core 10 fixed to the stationary cylinder 8 through a transformer ring 30 subsequently to be described. The rotatable transformer unit includes a rotatable transformer core 20 fixed to the rotatable disc 7a. Each of the transformer cores 10 and 20 is formed into an annular shape, and is formed of a ferrite material, for example. The transformer cores 10 and 20 are disposed closely adjacent to each other in confronting relation. The transformer core 10 has its outer diameter larger than that of the transformer core 20. Each of the confronting faces of the respective transformer cores 10 and 20 is formed with coil mounting grooves corresponding in number to signal transmission channels (three channels in the illustrated embodiment). The rotatable transformer unit further includes an annular RT plug 4 (see also FIGS. 3A through 3C) mounted on an upper surface of the rotatable transformer core 20. The plug 4 is provided with junction elements 41 which are in contact with RT connectors 9 provided on the rotatable cylinder 7. The RT connectors 9 are electrically connected to magnetic heads 5 which are fixedly mounted to the rotatable cylinder 7 through a head base 5a.

The rotary transformer will be described in detail hereunder.

Figure 2A:
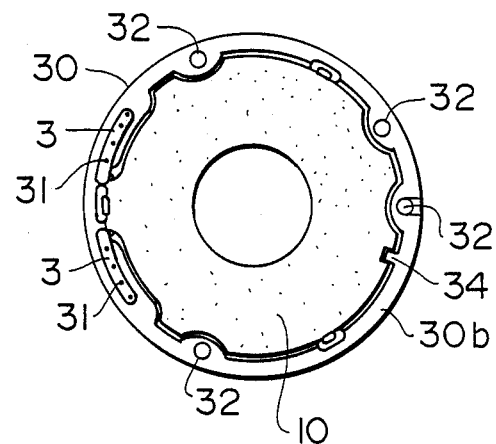
FIGS. 2A through 2C are respectively plan, side elevational and bottom views of a stationary transformer unit illustrated in FIG. 1.
Figure 2B:
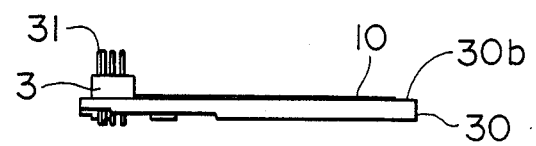
Figure 2C:
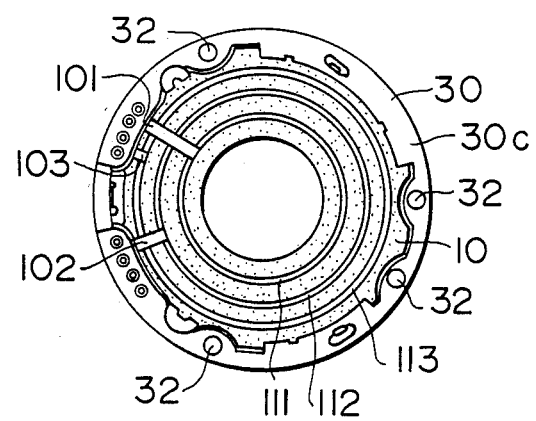
Figure 3A:
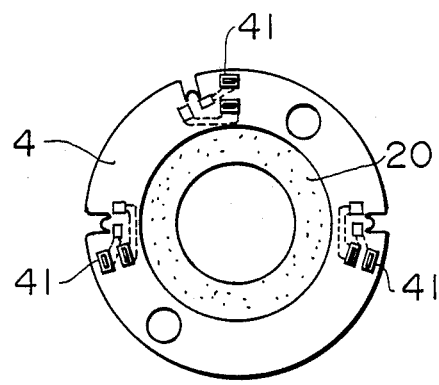
FIGS. 3A through 3C are respectively plan, side elevational and bottom view of a rotatable transformer unit illustrated in FIG. 1.
Figure 3B:
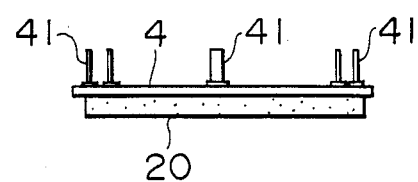
Figure 3C:
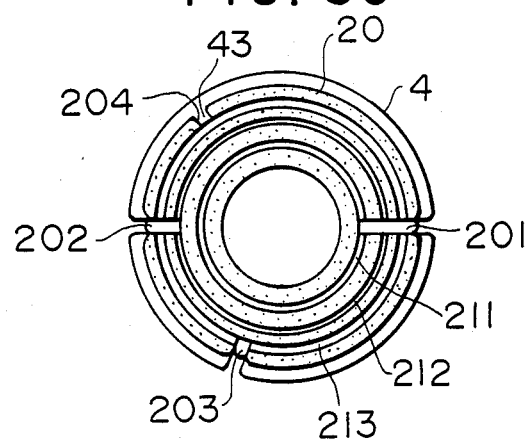
Figure 4A:
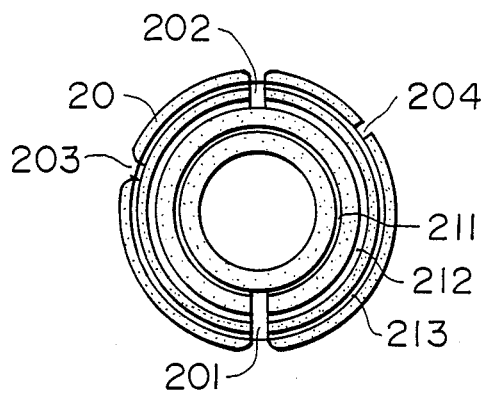
FIGS. 4A and 4B are respectively plan and cross-sectional side views of a rotatable transformer core of channel type in the rotatable transformer unit illustrated in FIG. 3.
Figure 4B:
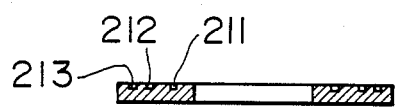
Figure 5A:
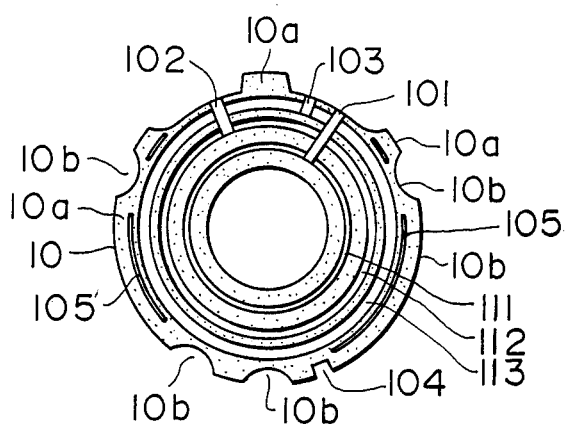
FIGS. 5A and 5B are respectively plan and cross-sectional side views of a stationary transformer core of channel type in the stationary transformer unit illustrated in FIG. 2.
Figure 5B:
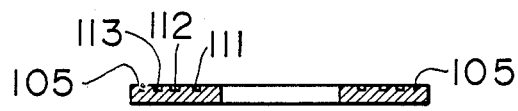
Figure 6A:
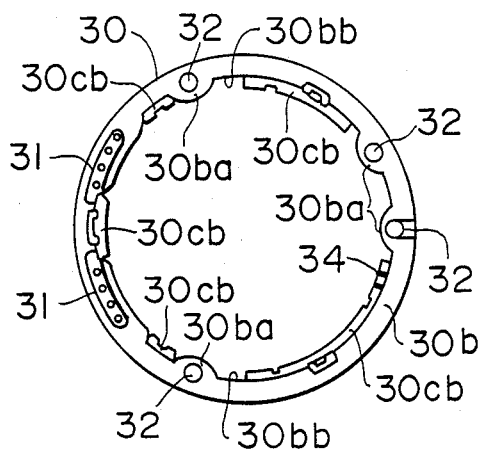
FIGS. 6A through 6C are respectively plan, side elevational and bottom views of a transformer ring in the stationary transformer unit illustrated in FIG. 2.
Figure 6B:
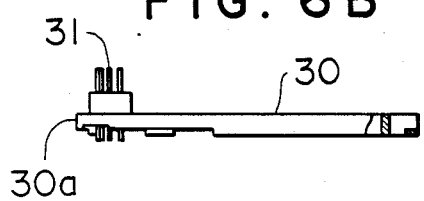
Figure 6C:
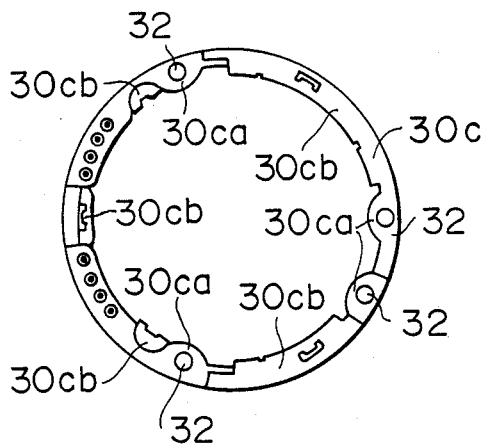

FIGS. 2A through 2C show the stationary transformer unit of three channel type. FIGS. 3A through 3C show the rotatable transformer unit employed in combination with the stationary transformer unit illustrated in FIGS. 2A-2C. FIGS. 4A and 4B show the transformer core 20 of the rotatable transformer unit. FIGS. 5A and 5B show the transformer core 10 of the stationary transformer unit. FIGS. 6A through 6C show the details of the transformer ring 30 used in the stationary transformer unit.

As shown in FIGS. 2A–2C and 6A–6C, the transformer ring 30 formed of a macromolecular material is composed of a ring body 30a surrounding the periphery of the stationary transformer core 10, and flanges 30b and 30c radially inwardly extending respectively from the opposite end faces of the ring body 30a as clearly shown in FIGS. 6A through 6C. The flange 30b is provided with projections 30ba and recesses 30bb enabling mounting of the stationary transformer core 10 subsequently to be described. The flange 30c is formed with projections 30ca confronting the projections 30ba on the flange 30b, and support portions 30cb confronting the recesses 30bb in the flange 30b for supporting the transformer core 10. One of the support portions 30cb is formed with a projection 34 for mating with a cutout 104 formed on the core 10 so as to position the core 10 with respect to the ring 30. Each of the projections 30ba and 30ca of the flanges 30b and 30c is provided with a core fixing screw bore 32 into which a screw 300 is inserted as shown in FIG. 1A to fix the transformer core 10 to the stationary cylinder 8 through the transformer ring 30. Plugs 3 (see FIG. 2A) are provided on a portion of the flange 30b, and are located as close as possible to the outer periphery of the transformer ring 30. Each plug 3 has four junction elements 31 extending vertically. The junction elements 31 are electrically connected to external circuit, e.g. a magnetic recording and reproducing circuit of a video player as shown in FIG. 1B.

As shown in FIGS. 3A–3C and 4A–4C, an end face of the rotatable transformer core 20 confronting the stationary transformer core 10 is formed with three concentric, coil mounting grooves 211, 212 and 213. An end face of the stationary transformer core 10 confronting the end face of the rotatable transformer core 20 is formed with three concentric, coil mounting grooves 111, 112 and 113. Annular signal transmission coils 1110, 1120, 1130, 2110, 2120, 2130 corresponding to the first, second and third channel heads are mounted in these grooves. The confronting end faces of the respective transformer cores 20 and 10 are also formed respectively with coil withdrawing grooves 201, 202 and 203 and 101, 102 and 103 for withdrawing radially outwardly leading terminals of the respective coils mounted in the respective coil mounting grooves 211, 212 and 213 and 111, 112 and 113. The transformer core 10 is further provided with grooves 105 for relief of adhesive used to fixedly bond the core 10 and the ring 30 to each other. A cutout 204 is formed on the outer periphery of the core 20 for mating with a projection 43 formed on the plug 4 to fix the relative position therebetween.

The outer peripheral surface of the core 10 is configured in a non-circular shape in conformity with the configuration of the above-described transformer ring 30. That is, the outer peripheral surface of the core 10 is provided with projections 10a which confront the support portions 30cb on the flange 30c of the transformer ring 30 and which are supported on the support portions 30cb and recesses 10b which confront the projections 30ba and 30ca of the respective flanges 30b and 30c and in which the projections 30ba and 30ca are fitted.

Because of the structure in which the stationary transformer core 10 is attached to the stationary cylinder 8 by the use of the transformer ring 30 disposed at the outer peripheral surface of the core 10, the core 10 is formed to have its outer diameter larger than that of the rotatable transformer core 20. The transformer core 10 and the transformer ring 30 are limited in outer diameter dimension because the size of the cylinders 7 and 8 is determined by the unified standards.

The rotatable and stationary cores of the rotary transformer function in such a manner that the cores confront each other. For this reason, in general, it is usual that the cores are formed to have the same size. In addition, since the outer diameter dimension of the cylinders 7 and 8 is determined by the unified standards, the transformer cores arranged respectively within the cylinders are also limited in size. When the rotary transformer having a large number of channels is arranged under such limitation, transmission loss in the rotary transformer varies depending upon the size of the transformer cores and the number of the channels.

In general, it is known that the greater the confronting area between the rotatable and stationary transformer cores 20 and 10 except for the coil mounting grooves 211 to 213 and 111 to 113 formed in the transformer cores, the lower the transmission loss.

In case of, for example, the rotary transformer of three channel type, it is possible to increase the core confronting area per channel if the non-circular stationary transformer core is fixed to the stationary cylinder by the above-described transformer ring as is in the present invention, as compared with the case where, as described previously, the circular or generally circular stationary transformer core is fixed to the stationary cylinder by the fixing member similar in configuration to the stationary transformer core. That is, if the stationary transformer core is formed to have its outer configuration of a non-circular shape as described above and if the transformer ring for fixing the core to the stationary cylinder is also formed to have the configuration similar to the core, it is possible to increase, to the maximum, the area of the face of the stationary transformer core which confronts the rotatable transformer core, so that the rotary transformer can be obtained which is low in transmission loss.

Moreover, the rotary transformer is provided with the plugs (junction elements) and, therefore, if the connectors are provided on the side of the magnetic heads and on the side of the circuit of the video player body, the electric connection between them can be achieved without the use of leads, soldering or the like. This facilitates assembling of the rotary transformer.

What is claimed is:
1. A rotary magnetic head assembly comprising:
   a rotatable cylinder having mounted thereon magnetic heads, said rotatable cylinder being attached to a rotary shaft of a motor through a rotatable member;
   a stationary cylinder disposed in confronting relation to and below said rotatable cylinder, said stationary cylinder being attached to said rotary shaft of the motor through bearings;
   a rotary transformer arranged between said rotatable and stationary cylinders, said rotary transformer including a rotatable transformer core fixedly mounted to said rotatable cylinder and a stationary transformer core fixedly mounted to said stationary cylinder in confronting relation to said rotatable transformer core, said stationary transformer core being of a non-circular shape having projections and recesses formed on an outer peripheral surface thereof, each of confronting faces of the respective rotatable and stationary cores being provided with annular grooves having mounted respectively therein signal transmission coils;

a first connecting member for electrically connecting said signal transmission coils mounted in the annular grooves of said rotatable transformer core to said magnetic heads;

an annular holding member for holding said stationary transformer core to enclose the outer peripheral surface of said stationary transformer core said holding member being provided, in its inner portion, with projections which are inserted into said recesses of said stationary transformer core and with recesses into which said projections of the stationary transfer core are inserted, said recesses of the holding member including holding portions for holding said stationary transformer core, said projections of the holding member including fixing portions having there in bores for fixing said stationary transformer core;

fixing members mounted in the bores of the holding member for fixing said stationary transformer core to said stationary cylinder through said holding member; and a second connecting member provided on said holding member along a circumferential direction of the holding member and including signal transmission junction elements for electrical connection to external circuits.

2. A rotary magnetic head assembly as defined in claim 1, wherein said stationary transformer core is formed to have its outer dimension larger than that of said rotatable transformer core.

3. A rotary magnetic head assembly as defined in claim 1, wherein said holding member comprises a first flange formed in conformity with an outer peripheral configuration of said stationary transformer core, a second flange having holding portions supporting said projections on said stationary transformer core, and a ring body connecting said first and second flanges to each other and surrounding the outer peripheral surface of said stationary transformer core, said first and second flanges being formed with recesses and projections corresponding respectively to said projections and said recesses of said stationary transformer core, said bores being formed in said projections of said first and second flanges.

* * * * *